United States Patent

Schmid et al.

[11] 3,935,110
[45] Jan. 27, 1976

[54] ENCLOSED FILTERING UNIT FOR FILTERING AND/OR TREATING LIQUID OR GASEOUS MEDIA

[75] Inventors: Paul Schmid; Albert Droesch, both of Riehen, Switzerland

[73] Assignee: GHH Basel AG, Basel, Switzerland

[22] Filed: Nov. 2, 1973

[21] Appl. No.: 412,413

[30] Foreign Application Priority Data
Feb. 21, 1973  Switzerland.......................... 2468/73

[52] U.S. Cl. ................ 210/445; 210/455; 210/456
[51] Int. Cl.² ........................................ B01D 29/16
[58] Field of Search ............................ 55/413, 418; 210/418–420, 445, 453–456, 460, 498

[56] References Cited
UNITED STATES PATENTS

| 865,691 | 9/1907 | Fox ..................................... 210/445 |
| 2,665,009 | 1/1954 | Harstick............................. 210/456 |
| 3,016,147 | 1/1962 | Cobb et al. ......................... 210/456 |
| 3,209,915 | 10/1965 | Gutkowski...................... 210/498 X |
| 3,361,261 | 1/1968 | Fairey et al..................... 210/445 X |
| 3,429,443 | 2/1969 | Stern............................... 210/456 X |
| 3,556,302 | 1/1971 | Agranat........................... 210/445 X |
| 3,782,083 | 1/1974 | Rosenberg...................... 210/445 X |

Primary Examiner—Charles N. Hart
Assistant Examiner—Richard W. Burks
Attorney, Agent, or Firm—Kurt Kelman

[57] ABSTRACT

A filter having two plate-shaped cover members whose opposite major faces are formed with grooves are sealed to each other to form a chamber in which opposite surfaces of a layer of filtering material are engaged by the grooved major faces and bound the grooves. A conduit and an opening in one cover member constitute an inlet path, and an opening in the other cover member and another conduit constitute an outlet path for the fluid to be filtered and the filtered fluid respectively, both paths being transverse to the two major faces. The fluid entering the chamber is deflected at right angles from the inlet path into a direction parallel to the major faces, and the filtered fluid is correspondingly deflected into the outlet path to avoid erosion of the filtering material.

9 Claims, 7 Drawing Figures

ENCLOSED FILTERING UNIT FOR FILTERING AND/OR TREATING LIQUID OR GASEOUS MEDIA

The present invention relates to enclosed filtering units.

A hitherto proposed enclosed filtering unit for filtering and/or treating liquid or gaseous media has the inlet side formed by a first cover plate and the outlet side is formed by a second cover plate, a filter layer being located between these cover plates. In this enclosed unit, hereinafter referred to as a filter unit of the kind specified, the cover plate at the inlet side has a substantially plane outside and an inside provided with medium communication passages, which passages are in communication with a plurality of inlet apertures which are distributed, at specific distances apart, over a portion of the surface of the first cover plate and which lead to the outside of this plate. The cover plate at the outlet side likewise has a substantially plane outside and an inside which is provided with second medium communication passages, which passages collect the medium flowing away from the filter or treatment layer and conduct it away from the discharge surface of said layer, in laminar flow. The second cover plate is provided with an outlet aperture which leads to the outside of this plate and which is connected to one of the collecting passages. Both cover plates are provided in their marginal region with parts of a sealing device and are connected to one another in a fluid-tight manner, and one of the cover plates is provided with separate centering means, in order to ensure that the filter unit is mounted in a holder in the correct position.

The provision of a relatively large number of inlet apertures distributed over a portion of the cover plate at the inlet side is a disadvantage insofar as a relatively large surface region is exposed to the free admission of air, when the filter units are stored. Furthermore, for the operation of the filter unit together with a filtering or treatment device, a housing or holder has to be selected which is capable of incorporating a medium distributing device at the inlet side and so leads to sealing problems. These sealing problems arise because pressure-tight and liquid parts are necessary not only between the housing portion at the inlet side and the filter unit, but also between the latter and the housing portion at the outlet side, and in addition towards the outside.

It is therefore an object of the present invention to provide an enclosed filter unit for filtering and/or treating liquid or gaseous media, of the kind specified, which enables the said disadvantages during the storage of the filter unit and in the arrangement of the device receiving the treatment element to be overcome by largely eliminating relatively large-area or long sealing points.

The enclosed element according to the invention, for filtering and/or treating liquid or gaseous media, having a first cover plate forming its inlet side, a second cover plate forming the outlet side, and a filter or treatment layer disposed between these cover plates, is characterised in that the first cover plate at the inlet side has a substantially plane outside and an inside provided with first medium communication passages, which passages are disposed in accordance with a first arrangement pattern, distributing the inflowing medium uniformly substantially over the entire active surface of the filter or treatment layer, that the second cover plate at the outlet side likewise has a substantially plane outside and an inside which is provided with second medium communication passages, which passages are disposed in accordance with a second arrangement pattern in order to collect the medium flowing away from the filter or treatment layer, and at least the one of the two cover plates is provided at its inside with clamping means which are situated radially outside the passage arrangement pattern and by means of which the filter or treatment layer disposed between the plates is compressed in order to prevent a flow of medium into the marginal regions of the layer. The two cover plates are preferably provided with inlet and outlet nipples which project above the outsides, and the bores in which are in communication with the medium communication passages at the insides of the plates. It is an advantage to provide, at the end of the inlet nipple bore, a first flow guide device which deflects the medium flowing in substantially perpendicular to the surface of the filter or treatment layer, into a direction extending substantially parallel to the surface of the layer at the inlet side, and into the medium communication passages. In the same way, it is also advisable to provide, at the inner end of the outlet nipple bore, a second flow guide device which deflects the medium emerging from the surface of the filter or treatment layer at the outlet side and flowing away through the medium communication passages at the outlet side, substantially parallel to the surface of the layer referred to in the second place, in a direction extending substantially perpendicular to this suface, into the filter nipple bore.

An embodiment of the invention will now be described, by way of example only with reference to the accompanying drawings in which.

Figure 1:
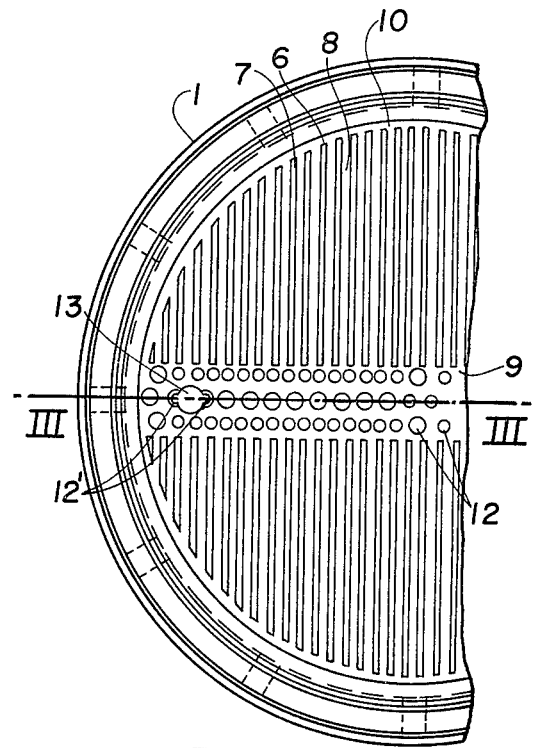
FIG. 1 is a partial plan of the cover plate at the inlet side, of an enclosed element for filtering and/or treating liquid or gaseous media, viewed from the inside of the filter unit.
Figure 2:
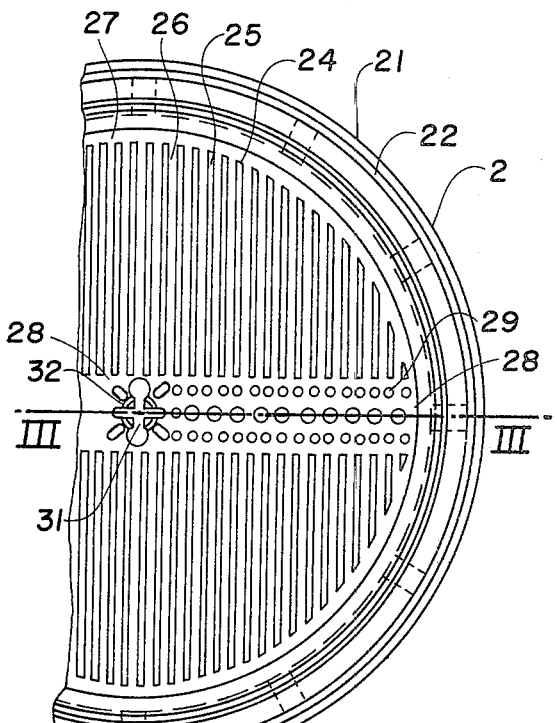
FIG. 2 is a partial plan of a cover plate at the outlet side, illustrated in a similar manner to FIG. 1, likewise seen from the inside of the filter unit.
Figure 3:
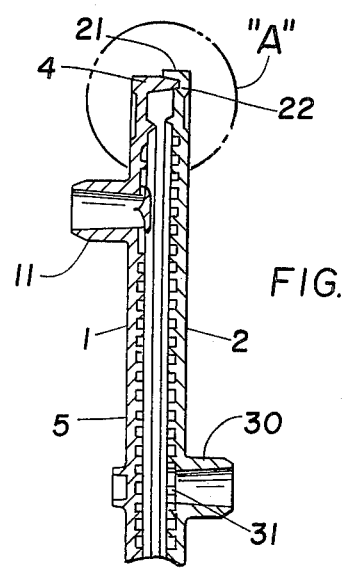
FIG. 3 is a partial section through the cover plates shown in FIGS. 1 and 2, brought into the assembly position, along the lines III—III in FIGS. 1 and 2, the treatment layer being omitted for reasons of clarity.

In FIGS. 1 to 4, the main components of an enclosed filter unit according to the invention for filtering and/or treating liquid or gaseous media are shown illustrated in plan and section, FIG. 1 showing the cover plate 1 at the inlet side, FIG. 2 the cover plate 2 at the outlet side, both viewed from the inside of the filter unit, and FIG. 3 showing the two cover plates in the assembled position, on substantially the same scale.

Figure 4:
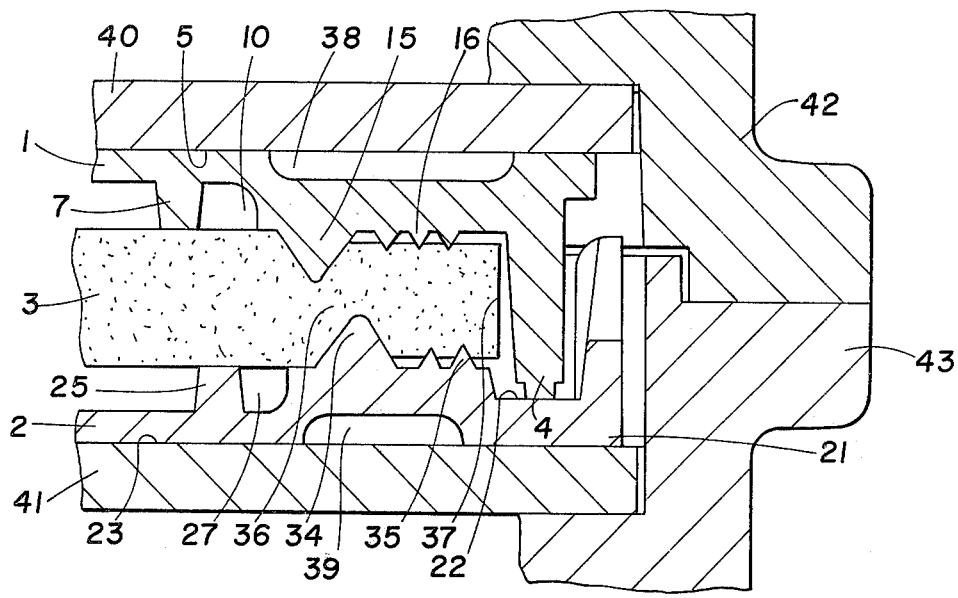
FIG. 4 shows the marginal portion "A" in FIG. 3 on a larger scale together with parts of an apparatus housing receiving an enclosed element according to the present invention.

In FIG. 3, the filter layer designated by 3 in FIG. 4 is omitted for reasons of clarity.

The cover plate 1 at the inlet side, which is provided with a peripheral rim 4, has a substantially plane outer, major face 5 and an inner, major face parallel to the outer face and formed with an array of passages 6. In the example shown, this comprises a plurality of parallel ribs 7 which are perpendicular to a diametral axis and which bound intervening passages or grooves 8 which extend from a relatively broad central collecting passage 9 to a peripheral groove 10 which is substantially the same depth as the passages 8. The ends of the ribs 7, which lie in a single plane and are adjacent to the filter or medium-treatment layer 3, are made flat, as can be seen from FIG. 4, and in their entirety form the base for the greater part of the layer 3 whose surface bounds the grooves 8. The passage width on the one hand, and the ratio between rib width and passage width on the other hand, are selected so that apart from providing a substantially uniform distribution of the pressure of the inflowing untreated medium over the whole effective area of the filter or treatment layer, this is stressed mechanically as little as possible. In an example of one form of the embodiment, the rib width amounts to about two thirds of the passage width.

The width of the collecting passage 9 is selected so that the medium supplied through an inlet nipple 11 projecting from the plane outside of the cover plate 1 can enter each of the passages 8 with substantially the same initial pressure. In order to achieve suitable supporting of the layer 3 in the region of the collecting passage 9 also, a plurality of substantially cylindrical supporting elements 12 are provided, their plan area in relation to the width of the collecting passage 9 being selected substantially in accordance with the same points of view as with regard to the ratio between the widths of the ribs 7 and the passages 8. The cross-sectional shape of these supporting elements 12 is not critical, however, and can be substantially as desired, consistent with technical considerations of flow.

Figure 5:
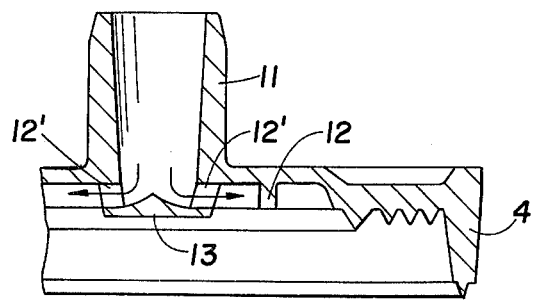
FIG. 5 shows a section through the inlet nipple for untreated medium in the cover plate of FIGS. 1 and 3, on a larger scale.

In order to avoid any erosion or cavitation action on the surface of the layer 3, in the region in which the inflowing medium enters the collecting passage 9 from the inlet nipple 11 in a path perpendicular to the plates 1, 2 and the layer 3, the inlet orifice is covered by a cap 13 (illustrated in section in FIG. 5) so that the entering medium is deflected in the direction of the arrows, that is to say substantially parallel to the major faces of the cover plates 1, 2. The cap 13, which is secured to two adjacent supporting elements 12, has a conical jet divider 14 for this purpose, the axis of which coincides with that of the inlet nipple 11 whose base overlies the opening in the cover plate 1, and which tapers inward of the nipple 11.

As an important component, the cover plate 1 at the inlet side comprises, in its marginal region of its inner face, a compression strip 15, which extends completely around the plate 1 and is triangular in cross-section, and a plurality of (preferably three) clamping beads 16 which likewise extend right around the plate 1 and which are situated radially outwardly of the compression strip as illustrated in FIG. 4. The function both of the compression strip 15 and of the clamping beads 16 will be described in detail later.

The cover plate 2 at the outlet side, as shown in FIGS. 2, 3 and 4, like the cover plate 1, likewise comprises a peripheral rim 21, which bears against the plate 1 radially outside the rim 4 and blocks off a sealing or condensation groove 22 from the outside. The major outside face 23 of the cover plate 2, like that of the cover plate 1, is substantially plane, while the major inside face is for the most part provided with a passage pattern 24 which as shown in FIG. 2, is similar to that of the plate 1. The same constructional details apply equally to the ribs 25 and the passages or grooves 26 as to the ribs 7 and the passages or grooves 8 in the plate 1. An encircling groove 27 similar to the groove 10 in plate 1 is provided, together with a collecting passage 28 with substantially cylindrical supporting elements 29 which correspond to the related parts 9 and 12 in the plate 1.

Figure 6:
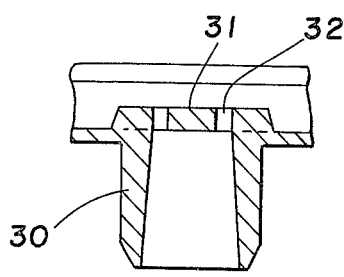
FIG. 6 shows a section through the outlet nipple for treated medium in the cover plate of FIGS. 2 and 3, on a larger scale.

In order to achieve as gentle and smooth a flow as possible, even in the region of the outlet path, that is to say at the inner orifice of the bore in the outlet nipple 30, the outlet orifice is provided with a cross-shaped or spider-shaped flow control member 31, which is illustrated in section in FIG. 6, the flow control member 31 is so situated that, of the whole cross-section of the bore, only four part-circular sectors 32 remain unblocked whereby the treated medium can flow out of the collecting passage 28 through these sectors 32.

Figure 7:
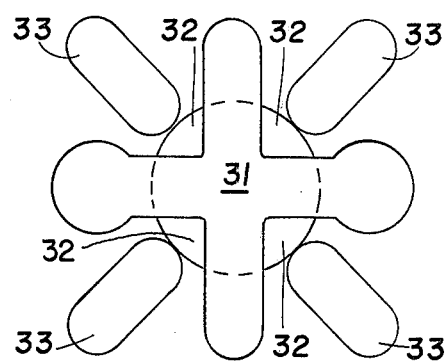
FIG. 7 is an enlarges illustration of the outlet point for treated medium at the inside of the cover plate shown in FIG. 2.

In FIG. 7, the flow control member 31 and its surroundings are illustrated in the same manner as in FIG. 2 but on a larger scale. Between the crossed arms of the flow control member 31 there are disposed guide walls 33 which supply the medium flowing from the collecting passage 28 to the part-circular sectors 32. The upper end of the flow control member 31 and the guide walls 33 are at the same height as the upper ends of the supporting elements 29 and form supporting points for the filter layer 3. It should be understood that this flow control member at the outlet side may alternatively have a different configuration, provided that a gentle and smooth flow of medium results, to prevent cavitation or erosion effects.

In the same manner as the cover plate 1 at the inlet side, the cover plate 2 at the outlet side comprises, in the marginal region of its inner face, an encircling compression strip 34 which is triangular in cross-section, and a plurality of (preferably two) clamping beads 35 which likewise extend all round and are situated radially outwardly of the compression strip 34.

It should be mentioned that the passage patterns shown in FIGS. 1 and 2 may have different shapes, both with regard to the formation of the collecting passages 9 and 28 and also the distributing passages 8 and 26, provided that as uniform a supply as possible of the medium to all active regions of the filter or treatment layer is achieved together with an unhindered discharge of the treated medium from the adjacent surface of the filter or treatment layer.

On condition that these requirements are met, the formation of the passage pattern, which may also be different for the two cover plates 1 and 2, is primarily a question of the most suitable method of manufacturing.

FIG. 4 shows, on a scale greater than the actual scale of the filter unit, the arrangement of the filter or treatment layer 3 between the two cover plates 1 and 2. As a result of the two compression strips 15 and 34, being offset somewhat in relation to one another or having unequal diameters, the filter layer 3 is constricted at 36 during assembly; that is to say when the two cover plates 1, 2 are assembled together the filter layer 3 is highly compressed as a result of which it becomes more difficult for the medium being treated to flow away in the direction of the edge 37. The marginal region of the filter or treatment layer 3 is further compressed by the clamping beads 16 and 35, and above all centred so as to render optimum the sealing action of the constriction between the compression strips 15 and 34. In order to be able to absorb resiliently the reaction forces caused by the compression strips 15 and 34 and the clamping beads 16 and 35, recesses 38, 39 are provided both on the cover plate 1 at the inlet side and on the cover plate 2 at the outlet side. The cover plates 1, 2 are connected to one another through the marginal flange 4, the outer end of the marginal flange 4 preferably being welded in a pressure-tight manner to the bottom of the sealing or condensation groove 22.

The illustration shown in FIG. 4, shows the enclosed filter unit consisting of the two cover plates 1, 2 and the filter or treatment layer 3, in a holder, of which an upper and a lower supporting member 40, 41 and housing portions 42, 43 are shown. The two housing portions may appropriately be connected to one another so as to be easily detachable, by means of a clamping device (not illustrated), for example a clamp. The two supporting members 40, 41 form supporting elements for the cover plates 1 and 2 which would otherwise easily arch outwards under high operating pressures.

What we claim is:

1. A fluid treating unit comprising:
   1. a first plate-shaped member having a major face formed wtih a plurality of grooves therein, said member being formed with an opening therethrough transverse to said major face and communicating with said grooves;
   2. a second plate-shaped member having a major face formed with a plurality of grooves therein, said second member being formed with an opening therethrough transverse to the major face of said second member and communicating with the grooves in the major face of said second member;
   3. a layer of treating material permeable to the fluid to be treated and having two opposite surfaces respectively engaged by said major faces and bounding said grooves in said major faces;
   4. sealing means connecting said plate-shaped members and therewith constituting a chamber enclosing said layer;
   5. a first conduit communicating with said opening in said first member and constituting an inlet path of flow into said chamber for a fluid to be treated;
   6. a second conduit communicating with said opening in said second member and constituting a discharge path of flow from said chamber for the treated fluid, (a) said paths being transverse to said major faces,
   7. first guide means in said chamber at said opening of said first member for deflecting fluid entering said chamber from said first conduit in said inlet path into a direction substantially parallel to the major face of said first member and for thereby preventing erosion of said layer; and
   8. second guide means in said chamber at the opening of the second member for deflecting fluid flowing in a direction substantially parallel to the major face of said second member in the grooves of said second member into said discharge path.

2. The unit of claim 1, wherein said first and second conduits constitute the only inlet path and the only outlet path of flow to and from said chamber respectively.

3. The unit of claim 1, wherein said first guide means include a substantially conical deflecting element having a base overlying said opening in said first member in said chamber, and tapering in a direction from said base inward of said inlet path.

4. The unit of claim 3, wherein said second guide means include a flow control element arranged in said opening in said second member, said element dividing said openings into a plurality of sectors, and a plurality of guide members in said chambers guiding fluid from said grooves to said sectors.

5. The unit of claim 4, wherein said flow control element is spider-shaped and has a plurality of angularly offset arms, said guide members being each arranged between two of said arms.

6. The unit of claim 3, further comprising a plurality of supporting elements projecting from the major face of said first member and engaging one of said opposite surfaces, said deflecting element being mounted on one of said supporting elements.

7. The unit of claim 1, wherein each of said plate-shaped members has an outer face substantially planar and parallel to said major face, said first and second conduits passing through said plate-shaped members between the respective faces thereof, the thickness of each member between the faces thereof being smaller than any dimension of said chamber parallel to said major faces.

8. The unit of claim 7, wherein said grooves in each of said major faces include a plurality of transversely spaced, elongated, parallel passages defining parallel, elongated ribs therebetween, and an elongated collecting passage transverse to said parallel passages and connecting the same, the depth of said parallel passages being substantially the same.

9. The unit of claim 8, wherein said opening in each of said members has an orifice in said major face spaced from said ribs, said guide means including respective guide elements received in said orifices.

* * * * *